Feb. 2, 1937.   C. I. GEDDES   2,069,548
VEHICLE BUMPER
Filed April 3, 1935

Inventor:
Charles I. Geddes,
Attys

Patented Feb. 2, 1937

2,069,548

UNITED STATES PATENT OFFICE 2,069,548

VEHICLE BUMPER

Charles I. Geddes, Arlington, Mass., assignor to A. S. Campbell Co., Inc., East Boston, Mass., a corporation of Massachusetts Application April 3, 1935, Serial No. 14,429

7 Claims. (Cl. 293—55)

The ordinary bumper utilized on automobiles, whether of one or several parts, consists essentially of a horizontally disposed bar of limited vertical dimension extending across the width of the vehicle. Since automobiles differ in height and since even in vehicles of the same kind the elevation of the bumper above the road will vary in accordance with the load in the vehicle, considerable inconvenience is caused by a bumper of one car passing above or below one of another or interlocking therewith. It has therefore been proposed to attach to the bumper bar vertical cross pieces providing a surface of considerable height or depth to engage the bumper of another car and prevent such interlocking. Such devices may be termed vertical bumpers. My invention aims to provide a convenient and efficient device of this nature of attractive appearance.

My invention will be well understood by reference to the following description of illustrative embodiments thereof taken in connection with the accompanying drawing, wherein.

Figure 1:
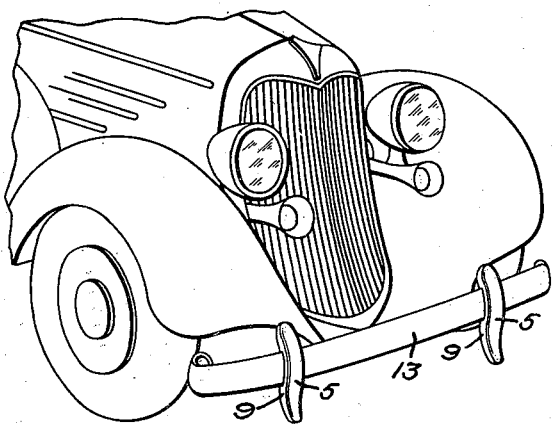
Fig. 1 is a perspective of a vehicle carrying vertical bumpers according to my invention.
Figure 2:
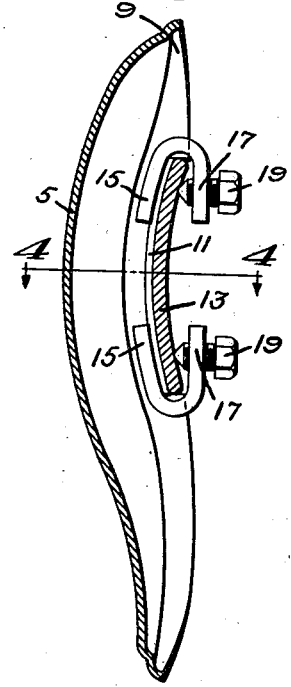
Fig. 2 is a central vertical section through the bumper in position on a horizontal bumper bar.

Referring to the embodiment of the invention shown in the drawing, the vertical bumper comprises a main body consisting of a hollow sheet metal stamping having a front face 5 and a rearwardly extending, marginal portion 9. It is herein shown as taking substantially the form of an elongated ellipse in front elevation as seen in Fig. 1, curved to the desired profile as best seen in Fig. 2. The shape, of course, may be widely varied.

The device here shown is adapted for application to a horizontal bumper of the single bar type and the marginal portion is provided with the relatively short, inwardly extending flanges 11 adapted to seat on the front face of the bumper bar 13 and to provide means for clamping the attachment in position, as will hereinafter more fully appear. Herein the marginal portion 9 is slit and portions between the slits bent inwardly to form the flanges 11, thus defining notches in the marginal portion at the location of the flanges into which the bar 13 extends.

Figure 3:
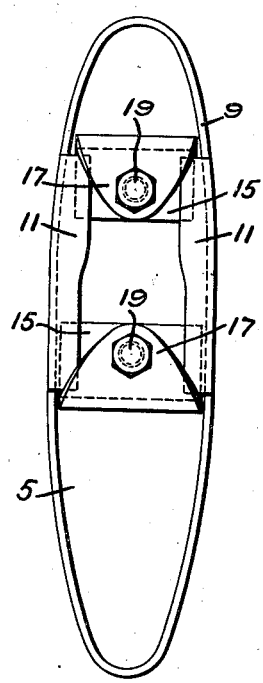
Fig. 3 is a rear view, the horizontal bumper bar being omitted.
Figure 4:
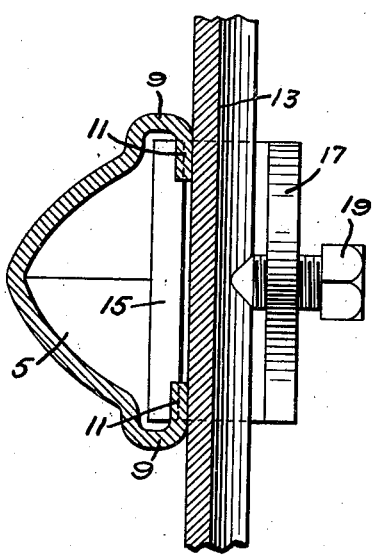
Fig. 4 is a transverse section on an enlarged scale taken on the line 4—4 of Fig. 2.

To secure the device in position on the bar I may provide a clamping plate received within the hollow body, engaging the front faces of the flanges 11 and provided with suitable means, preferably of the screw type, for stressing them toward the bumper bar 13. One suitable form of clamping device as herein shown takes the form of a U-shaped member having a forward leg 15 adapted to be slid into the hollow of the body from the rear above the flanges 11, where an opening is provided between the margins of the body greater in width than the distance between the ends of the flanges, thus to engage the inner faces of the flanges over a suitably extended area to provide a secure grip, as best seen in Figs. 3 and 4. The U-shaped member here straddles the edge of the bumper bar and its other leg 17 depends at the rear thereof and may receive a bolt 19 tapped into the same and adapted to be set up against the rear face of the bar 13 in the manner of a set screw. I have herein shown two such clamp members for securing the vertical bumper, one at either edge of the bumper bar 13, as by such a construction the legs may be made relatively short and the strain distributed and equalized.

It will be noted that in the device shown the main body may be formed by press work only and in a unit complete in itself. No welding operations are required. Not only is it cheap to manufacture but it offers marked advantages in finishing. Such devices are usually plated. The body, being of uniform thickness and free from any scale such as might result from a welding operation, may be plated cheaply and conveniently to produce a high class job. Thereafter the securing means are mechanically engaged and, as will be apparent from Fig. 2, they are substantially concealed within the hollow of the bumper which presents an uninterrupted front face and margin of attractive appearance.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:—

1. A bumper attachment comprising a hollow sheet metal body having a front face and a rearwardly extending margin, the marginal portion being slit and portions thereof between the slits inturned to provide notches to receive a bumper bar and flanges to seat on the front face thereof, and means for securing said attachment to the bumper bar comprising a plate slidably received within the hollow of the body to bear on the front face of said flanges and a bolt carried thereby cooperating with the bar.

2. A bumper attachment comprising a hollow sheet metal body having a front face and a rearwardly extending margin, the marginal portion being slit and portions thereof between the slits inturned to provide notches to receive a bumper bar and flanges to seat on the front face thereof, and clamping means cooperating with the forward face of the flanges and the rear face of the bumper bar for clamping the attachment to the bar.

3. A bumper attachment comprising a hollow sheet metal body having a front face and a rearwardly extending margin, the marginal portion being slit and portions thereof between the slits inturned to provide notches to receive a bumper bar and flanges to seat on the front face thereof, and means for securing the attachment to a bumper bar comprising a part interlocking with said flanges.

4. A bumper attachment comprising a hollow sheet metal body having a front face and a rearwardly extending margin, the marginal portion being slit and portions thereof between the slits inturned to provide notches to receive a bumper bar and flanges to seat on the front face thereof, U-shaped members adapted to straddle the edges of a bumper bar with one leg overlying said flanges, and means for exerting a clamping stress between the other leg and the bar.

5. A bumper attachment comprising a hollow sheet metal body having a front face and a rearwardly extending margin, relatively short flanges extending inwardly from said margin to seat on the front face of a bumper bar and screw clamping means for securing said attachment to the bar comprising a part insertable into the hollow of the body to overlie the flanges.

6. A bumper attachment comprising a hollow sheet metal body having a front face and a rearwardly extending margin, said margin having inwardly extending flanges providing a seat for the front face of the bumper bar, there being an opening to the hollow of the body adjacent said flanges of greater width than the distance between them, and clamping means for securing said attachment to the bumper bar comprising a part adapted to pass through said opening into the hollow of the body to overlie the said flanges.

7. A bumper attachment comprising a sheet metal body of substantial strength to resist collision shocks and comprising a front face and a rearwardly extending margin defining a rearwardly opening hollow, members adapted to overlie the edges of the bumper having portions extending from the rear into the hollow, means disposed entirely rearward of said face for engaging said portions to lock together the body and said members and screws carried by the distal parts of said members adapted to be set up against the bumper bar.

CHARLES I. GEDDES.